(12) United States Patent
Maeuser

(10) Patent No.: US 7,388,548 B2
(45) Date of Patent: Jun. 17, 2008

(54) WINDOW AERIAL FOR MOTOR VEHICLES

(75) Inventor: Helmut Maeuser, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/555,103

(22) PCT Filed: Apr. 21, 2004

(86) PCT No.: PCT/FR2004/000978

§ 371 (c)(1),
(2), (4) Date: Jul. 19, 2006

(87) PCT Pub. No.: WO2004/100311

PCT Pub. Date: Nov. 18, 2004

(65) Prior Publication Data

US 2006/0273966 A1 Dec. 7, 2006

(30) Foreign Application Priority Data

May 2, 2003 (DE) .................. 103 19 606

(51) Int. Cl.
*H01Q 1/32* (2006.01)
(52) U.S. Cl. ..................... 343/713; 343/711
(58) Field of Classification Search .......... 343/711–713
See application file for complete search history.

(56) References Cited

U.S. PATENT DOCUMENTS

| 5,285,048 A | * | 2/1994 | Nakase .................. 219/203 |
| 5,926,141 A | | 7/1999 | Lindenmeier et al. ....... 343/713 |
| 6,191,746 B1 | | 2/2001 | Nagy .................. 343/713 |
| 6,320,276 B1 | * | 11/2001 | Sauer .................. 307/10.1 |
| 6,567,647 B1 | * | 5/2003 | Epperson .................. 455/83 |

FOREIGN PATENT DOCUMENTS

EP 0 975 045 1/2000

* cited by examiner

*Primary Examiner*—Shih-Chao Chen
(74) *Attorney, Agent, or Firm*—Oblon, Spivak, McClelland, Maier & Neustadt, P.C.

(57) ABSTRACT

An antenna glazing for automobiles, including an electrically conducting cladding extending surface-wise over the surface of the glazing up to a zone of the free edge of the cladding, serving as an antenna element, and a coupling electrode furnished with external connections, coupled in the capacitive regime to the electrically conducting cladding with interposition of an insulating layer. The coupling electrode is composed at least of one thin wire, which starts from the zone at the edge of the glazing, is conducted over the surface covered by the cladding, and is returned to the zone of the edge with at least one fold, so that the two ends of the wire are situated in the zone of the edge of the glazing.

16 Claims, 2 Drawing Sheets

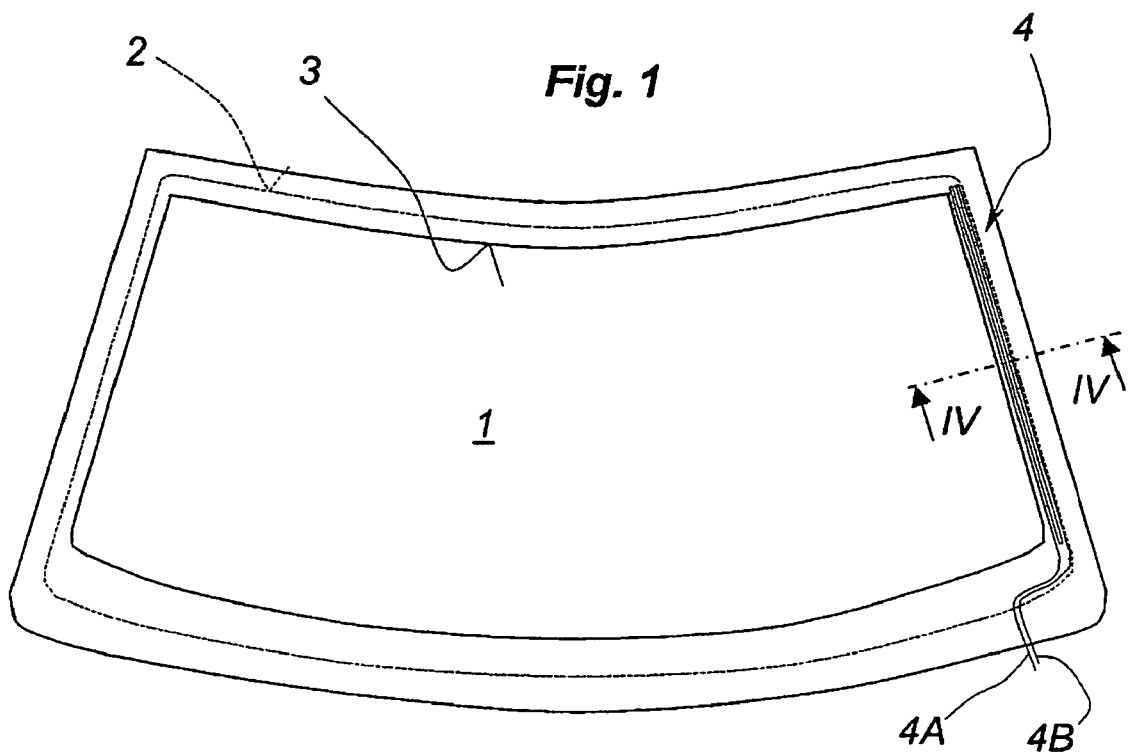
*Fig. 1*
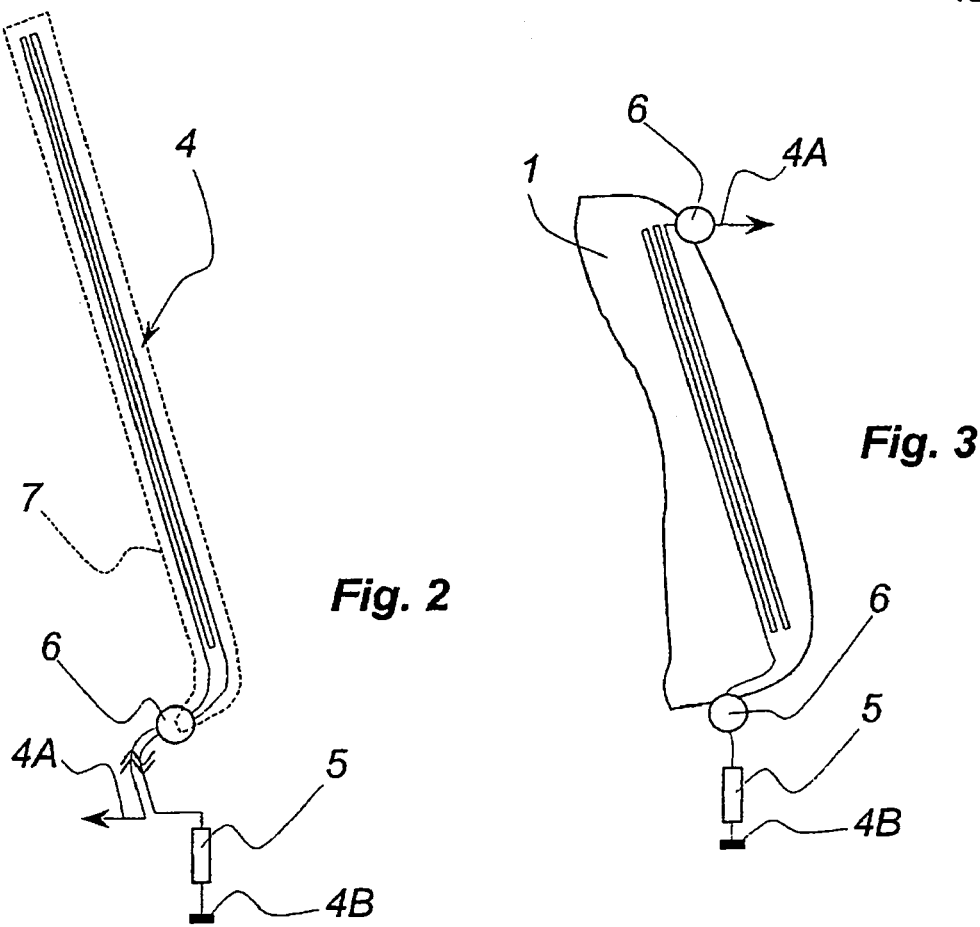
*Fig. 2*
*Fig. 3*

WINDOW AERIAL FOR MOTOR VEHICLES

FIELD OF THE INVENTION

The invention relates to an antenna glazing for automobiles exhibiting the characteristics of the preamble of claim 1.

DISCUSSION OF THE BACKGROUND

Document DE 198 32 228 C2 discloses an antenna glazing for automobiles possessing these characteristics, in which an electrically conducting cladding is used as antenna element. To decouple antenna signals originating from the cladding placed inside the glazing made in the guise of composite glazing, a coupling electrode is coupled in the capacitive regime to said cladding. Said electrode is composed of a plurality of thin wires placed parallel to and some distance from one another, which are linked electrically at one end by means of a busbar or similar, and extend over the cladding starting from this connection. The dielectric intermediate layer of the capacitor thus formed is constituted by at least one adhesive layer of the composite.

This form of construction of a coupling electrode offers, by comparison with prior embodiments comprising a narrow contact band applied by screen-printing or a construction in the form of a sheet to one of the glazings of the composite, the big advantage that it is practically not seen in the fitted state. Almost inevitably, these coupling electrodes are in fact situated in the visual field of the glazing in question, which is installed, for example in the guise of windscreen, on an automobile with metal bodywork, since in such cases of use, it is necessary to part or cut the cladding, the whole way along the edge of the glazing, in order to avoid direct coupling of the antenna field with the bodywork (earthed). It is therefore not possible to provide said coupling electrode very near to the edge of said glazing where it might be optically hidden by the framework of the window.

If wires of, for example, 10 to 100 μm in diameter are placed inside a composite glazing or on its surface, they cannot be discerned as such under normal conditions, unless they are placed very short distances apart. If on the other hand their mutual separation is at least very nearly ten times their diameter, they may not be visible as such unless one looks at them from very near the glass glazing. With the known antenna glazing, it has been demonstrated that, compared with a plane coupling electrode, consisting for example of a band of metal sheet, the coupling capacity is, in the case of the embodiment in accordance with the invention, amply sufficient for the transmission of the signal of the antenna.

Practical applications of the thin wires coupling electrode show, however, that with the wires connected at one end only, the desired transmission power is not always obtained. For optimal optical inlay, the number of wires and hence the total width of the electrode are kept as small as possible. Within the framework of industrial manufacture, the establishment of electrical contact of the whole set of wires with the common connection electrode (at the base of the antenna) may not, however, be fully achieved. In the final analysis, there is no reliable test procedure making it possible to test the operating capacitance of the coupling electrode before and/or after the manufacture of the composite forming the glazing. If manufacture has terminated, and if defective coupling is found thereafter, the whole pane has to be scrapped.

One could contemplate lengthening the wires and allowing them to overhang on both sides, beyond the glazing, so that then a continuity check is possible. It would however still always be necessary to test each wire individually or its contact with the base of the antenna, so much so that a noticeable reduction in expenditure cannot be expected from this variant.

Document DE 42 37 818 A1 describes an antenna glazing for automobiles, on the surface of which is placed an antenna for radio signals in the form of a loop, made by screen-printing. Starting from a plane connection zone made in the zone of the edge of the glazing, a strand of the loop penetrates the visual field of the glazing as far as the inversion point, from which the other strand returns. The free end thereof forming the base of the antenna is surrounded, with a slot-shaped gap, by the plane starting zone of the first strand. This structure forms the antenna proper and is not provided for capacitive coupling with a plane antenna structure.

SUMMARY OF THE INVENTION

The invention proposes to further refine from the point of view of security of operation an antenna glazing of the type of that described in document DE 198 32 228 C2.

According to the invention, this problem is solved according to the features claimed.

If, instead simply of using parallel wires terminating "blindly", the coupling electrode comprises at least one thin wire with two ends disposed in the zone at the edge of the glazing, a limitation of the conductivity through the absence of contact of a wire or of an end of a wire with a gather point is already avoided a priori. With customary test procedures, the continuity of the coupling electrode prefabricated or also already laid can be checked in a simple manner. From the industrial automation point of view, there is no need for any major reorganization to lay the wire on or in the composite glazing; it is possible to resort to the same means as those that are used in the case of the already known coupling electrode. In principle, the ends of the wire may also be conducted to the outside, away from a composite forming the glazing, so that any contact problems can also be eliminated again on the completed glazing.

It is also possible to conceive of a check being done in the fitted state, within the framework of a diagnostic device for the corresponding apparatus (selector of channels, radio, TV), so that with their diagnosis, it is possible at one and the same time to also check the operating capacitance of the antenna and of the corresponding functional elements, and especially of the coupling electrode and of its connections.

It is true that, preferably, the two ends of the wire will be joined in local proximity, and thus make the wire describe at least one simple loop. However, this is not absolutely necessary. It also comes within the framework of the invention to place some distance apart, for example each at a corner of the glazing, the two ends situated on either side of a track, at least with a double fold, described by the wire. The number of portions of conductor forming the loop may in this case be odd, whereas it will be even in the case of external connections narrowly separated from the electrode loop.

The folding, at least single folding, of the wire is necessary to give the coupling electrode a virtual surface (determined by the mutual separation of the parallel portions of wire), which is sufficient for the capacitive coupling.

A coupling electrode in accordance with the invention may in principle also comprise more than one wire or more than one loop. It would be conceivable, for example, to provide two or more unipolar loops, nested one inside the other or disposed parallel to and alongside one another, even if preference should be given to the solution with one wire, on account of the smaller number of external contacts to be established.

To establish the external contact of the coupling electrode, there is preferably provided an appropriate interface (multiple connector, flat conductor, male/female connector) at the edge of the glazing 1. Connections with the receiver apparatus (radio, selector of channels, TV, etc.) as well as with a voltage source of which we shall say more later are thus established, the glazing 1 being fitted. Multipolar interfaces such as these constitute as such the state of the art (cf. for example DE-C 195 36 131) and consequently will not be explained in greater detail here. We shall make no further mention of the prevention measures, etc., that may be necessary, since they are customary for the person skilled in the art.

With all these measures, the rate of scrap accumulating due to failures of contact in the coupling electrode of finished glazings is appreciably reduced as compared with the known antenna glazing, and after fitting of such a glazing into an automobile, a checking function is still possible.

The number of wires overlaid on the antenna in the form of a thin layer and hence the transmission power of the capacitor thus formed may be influenced depending on requirements by the laying of several loops inside a coupling electrode or simply by a simple or multiple fold of a loop taking a sinuous profile. The latter measure makes it possible to obtain a large surface coverage, without, however, losing the possibility of performing a simple check of continuity. As the case may be, it would be possible to form a single electrode according to the invention from several wires of the type described hereinabove.

In the manner of the known coupling electrode, the loop or loops may be prefabricated on an adhesive sheet and be laid, with the latter, at the desired location on a rigid pane of the antenna glazing. This prefitting assembly may also be equipped with an appropriate interface for the external connections, the quality of whose contact may already be verified in advance.

Within the framework of a fitting for diversity at the antenna, provision may be made, in an antenna glazing, for several coupling electrodes constructed in accordance with the invention, distributed around the rim of the glazing. In an advantageous manner, the connections of ends of several coupling electrodes (for example in the corners) may be joined on the edge of the glazing, in local proximity to one another, and contacted towards the outside with several poles, possibly with a common interface. This may simplify the manner of proceeding in the logistic circuit and also the fitting of the electrical connections of such a glazing.

In an additional and non-obvious function, a coupling electrode according to the invention could, for example, be utilized if it were placed in the resting zone of a windscreen wiper of an automobile glazing (windscreen and/or back window), were exposed to a supply voltage which may itself be superimposed on the voltage of the signal, and could, as required, serve as separately activatable heating element. In a case of application of this kind, it is nevertheless advisable to take appropriate measures known per se to decouple the supply voltage and the HF signals, taking for example the form of interconnected coils.

In principle, the invention may be applied not only to composite glass glazings, but also to monolithic glazings for automobiles, in the case of which the electrically conducting cladding is placed on the surface pointing towards the cabin. In this case, the cladding preferably consists of conducting materials applied by pyrolysis, such as for example doped zinc oxide. Furthermore, the wire of the coupling electrode is embedded between dielectric sheets made from a transparent polymer. The sheet directed towards the electrically conducting cladding is preferably composed of an adhesive material or is provided with a layer of glue, with the aid of which the coupling electrode is glued to the glass pane.

However, the invention applies first and foremost to composite or laminated glass glazings. Consequently, it is described here with the aid of exemplary embodiments in respect of composite glass glazings. While motor vehicle windscreen glazings are almost exclusively composed of composite glass, composite glass is being increasingly used also for the back and side windows, so that antenna glazings of the invention are not fundamentally limited to windscreens, but quite obviously may be used for all the window panes of automobiles.

BRIEF DESCRIPTION OF THE DRAWINGS

Other details and advantages of the subject matter of the invention may be gleaned from the drawings of exemplary embodiments and of their thorough descriptions which follow.

Represented in simplified form are:

FIG. 1 is a front elevational view of an antenna glazing of the invention,

FIG. 2 is an enlarged detail view of the coupling electrode according to FIG. 1, FIG. 3 is a view of a variant execution of a coupling electrode of the invention.

DETAILED DESCRIPTION OF THE PREFERRED EMBODIMENTS

Figure 4:
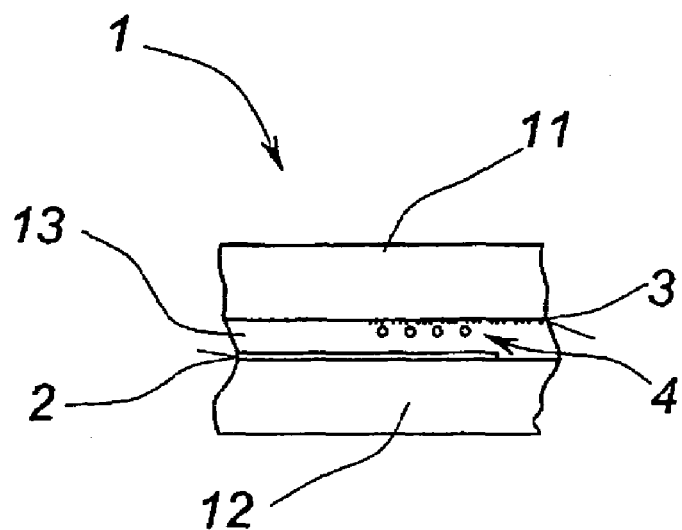
FIG. 4 is a partial sectional view of the antenna glazing according to FIG. 1 (line IV IV)

According to FIG. 1, an antenna glazing 1 is furnished with an electrically conducting cladding 2 over the whole of its surface, but which has nevertheless been parted away from the rim in the zone at the edge of the glazing 1 or has not been applied at all. A dashed line demarcates the outside edge of the cladding homogeneously covering the visual field of the glazing 1. At the periphery, over the whole of the outer rim of the glazing 1, an opaque edge strip 3, known per se, has also been provided, surrounding the visual field proper of the glazing 1. This edge strip 3 is in practice composed of an opaque ink, for example a curable screen-printing paste, and overlaps or covers on the one hand the customary adhesion-based fixation of such a glazing, and on the other hand, also the edge of the cladding 2. Here, it has however been drawn see-through for representational requirements.

As already stated, such an antenna glazing 1 is glued to a collar, generally metallic, of a bodywork which has not been represented. The cladding, which may be used, alongside other functions (such as the heating of surfaces and/or isolation from infrared), as antenna, must terminate at least 20 mm before the outside edge of the glazing 1, so that it is not earthed with the bodywork considering the surface area/capacitance ratio. In the latter case, it would not be able to conduct any signal voltage, or only an overly weak voltage.

To link the cladding 2 to a receiver apparatus, there is provided a coupling electrode 4 consisting of a thin wire. To fabricate the coupling electrode 4, use is preferably made of a tungsten wire, in view of the advantageous ratio between small thickness of the wire and tensile strength. In this embodiment, the electrode extends along one of the lateral edges of the antenna glazing 1 and is covered surface-wise by the cladding 2, without, however, touching the latter. The electrode is therefore linked to the cladding in the capacitive regime at high frequency and at low impedance.

Preferably, the coupling electrode 4 lies in the zone of the overlapping of cladding 2 by the edge strip 3. It is then invisible to inspection from the glazing 1. Optionally, if a complete inlay of the coupling electrode 4 with the aid of the edge strip 3 is not possible, the wire constituting the coupling electrode 4 can be darkened on the surface, to such an extent that it is practically invisible.

Naturally, in variants (not represented) of the invention, the electrode may extend only partially along one of the edges of the glazing.

The antenna glazing 1 is, in the manner known per se, a composite glazing with two rigid glass or plastic panes (see FIGS. 4 and 5); including mixed composites consisting of a glass and a plastic pane are quite obviously possible likewise. The cladding 2 and the coupling electrode 4 are placed inside the composite glazing, hence between the two rigid panes, but separated from one another galvanically, by a dielectric intermediate layer. It would quite obviously, in principle, be possible to use a galvanic coupling between the wire and the cladding, but there is no certainty that it could be done without defect and in a safe manner.

Two free ends 4A and 4B of the coupling electrode 4 are conducted to the outside beyond the outside edge of the glazing 1.

In a variant of the representation of FIG. 1 (not represented), the antenna glazing of the invention may also be furnished with several coupling electrodes, which may extend for example along the second lateral edge and/or along the upper and/or lower longitudinal edge, and may also extend into the visual field and/or into a corner angle. In such a configuration, each coupling electrode may send, depending on the situation of reception, a different output signal to a diversity antenna device.

FIG. 2 shows the coupling electrode 4 in a magnified representation. It may be seen that it is composed of a single continuous wire, which nevertheless forms a once-folded loop. The wire is therefore folded back until its ends are in proximity, starting from the point of reversal furthest from the ends, the portions of wire extending parallel to one another with separations which are appreciably larger than the thickness of the wire. Thus, the coupling electrode 4 comprises, between its ends 4A and 4B, four mutually parallel portions of wire which meet at their ends at the level of points of inversion. A test current allowing simple a posterior checking of electrical continuity can therefore be passed through the two ends 4A and 4B.

The critical points are, however, less the wire of the coupling electrode with high stability per se than the bonds which link thereto. As is known, tungsten is not very suitable for soft soldering, so that there is some degree of risk of poor contact of the coupling electrode to the outside. In FIG. 2, a leftward arrow at end 4A indicates the connection to an amplifier (not represented) while upstream of the end 4B (earthed), a matching resistor 5 has been introduced into the loop. The latter allows matching in accordance with the requirements of the impedance of the base of the coupling electrode 4 or even of the whole antenna assembly. An interface 6 is only demarcated by a circle; provision may be made here for a transition of the thin wire from the coupling electrode 4 to the external connections. A sheet-like substrate 7, that can serve for the prefitting of the coupling electrode 4 and possibly of the interface 6 has also been represented as dashes. This sheet-like substrate constitutes a support or an intermediate support for the thin wire of the coupling electrode and simplifies the deposition of the coupling electrode on the antenna glazing 1.

Consequently, the contact zones lie directly at the edge of the antenna glazing 1 and may be situated outside of the composite forming the glazing. The contacts finally established by soldering, pinching and/or gluing with conducting glues may subsequently be checked in an operation with the test current mentioned previously, as a consequence of which, unlike the case of the already known coupling electrode, repair is possible outside the composite of the glazing. As the case may be, it is even possible to replace the matching resistor 5 or (in case of variable production) to readjust it.

The length of the thin wire forming the coupling electrode 4 determines the capacitance of the coupling capacitor and may be dimensioned from the standpoint of the least possible reduction; it should be at least 5 cm, approximately, and preferably from 10 to 30 cm. Likewise, the number of parallel portions of wire is important in respect of the coupling capacity; an increase in the folds of the wire also makes it possible to boost the strength of the useful antenna signal.

FIG. 3 represents a variant of the coupling electrode 4, in which the two ends 4A and 4B are conducted to two spaced apart points of the edge of the glazing 1, outside the surface of the cladding. Of the antenna glazing 1, only an extract has been shown, for the sake of simplification, without indicating the cladding and the edge strip. Here, there is no problem in appreciating that the coupling electrode 4 is made with an odd number of portions of wire (five portions) with four folds of the continuous wire. Such a variant provided for by the invention may be advantageous, for example if the positions for the electrical connections predefined by the automobile manufacturer are not close to one another, as in FIG. 1, or if several antenna bases of different coupling electrodes, fitted for example at the corners, need to be joined.

FIG. 4 represents a partial sectional view of the glazing 1 of FIG. 1, near its lateral edge. Depicted therein is the glazing 1 composed of two rigid panes 11 and 12 which are bonded together with the aid of an adhesive layer 13 to form a standard laminated or compound glazing. The outside surface of the glazing (in its fitted state) is at the top. Also depicted are the cladding 2 and the opaque edge strip 3, which are separated from one another by the electrically insulating adhesive layer 13. The cladding 2 terminates before the edge of the glazing 1, as already indicated in FIG. 1. The thin wire forming the electrode 4 rests on the edge strip 3, and is therefore not visible from the outside. This wire 4 is separated from the cladding 2 by the adhesive layer 13 also forming the dielectric of a capacitor. In the finished state of the glazing 1, the wire of the coupling electrode 4 is practically integrated into the adhesive layer 13 which may be a thermoplastic sheet of for example polyvinyl butyral.

Figure 5:
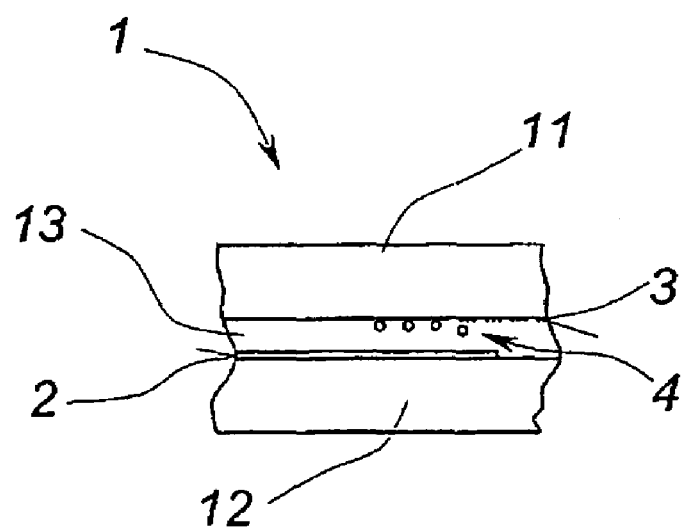
FIG. 5 is another partial sectional view of an antenna glazing in a variant of FIG. 4.

According to FIG. 5, which shows a variant of FIG. 4, the only difference resides in the fact that the thin wire forming the electrode 4 does not rest in its entirety on the edge strip 3 but lies at least partially in the field of vision of the glazing 1 surrounded by the edge strip 3.

In the present invention, it goes without saying that the electrode 4 may also be disposed wholly in the field of vision of an antenna glazing.

The invention claimed is:

1. An antenna glazing for automobiles, comprising:
   an electrically conducting cladding extending over a surface of the glazing, an edge zone around an outer periphery of the glazing being free of the cladding, said cladding serving as antenna element; and
   a coupling electrode including external connections and a wire, said electrode being capacitively coupled to the cladding through an insulating layer, wherein the wire includes two ends electrically connected with the external connections, the two ends located at the edge zone, and the wire is arranged such that one end of the two ends is located at the edge zone, is conducted over the surface covered by the cladding, and is returned to the edge zone by forming at least one loop.

2. The antenna glazing as claimed in claim 1, wherein said wire has a meander-like arrangement on the glazing, with portions of the wire arranged in parallel, and a spacing between portions of the wire that are arranged in parallel to each other are larger than the thickness of the wire.

3. The antenna glazing as claimed in claim 1, wherein the two ends of the wire of the coupling electrode are placed at different locations of the edge zone.

4. The antenna glazing as claimed in claim 3, wherein the two ends of the wire of the coupling electrode are placed in two different corners that belong to one edge of the glazing.

5. The antenna glazing as claimed in claim 1, wherein one end of the wire of the coupling electrode is linked to at least one of a receiver or transmitter, and a other end either free or terminated by a matching resistor.

6. The antenna glazing as claimed in claim 1, further comprising an additional coupling electrode, wherein the coupling electrode and the additional coupling electrode are arranged in different edges of the glazing.

7. The antenna glazing as claimed in claim 6, wherein the ends of the wires of the coupling electrodes are placed in a narrow local neighborhood.

8. The antenna glazing as claimed in claim 6, wherein the coupling electrode is arranged in a side edge of the glazing and the additional coupling electrode is arranged in a longitudinal edge of the glazing.

9. The antenna glazing as claimed in claim 6, where the coupling electrode and the additional coupling electrode form a diversity antenna device.

10. The antenna glazing as claimed in claim 1, further comprising: an opaque edge strip at least partially covering the coupling electrode.

11. The antenna glazing as claimed in claim 1, further comprising: a connection element configured to establish the external connections for the coupling electrode forming an interface that is linked to the ends of the wire.

12. The antenna glazing as claimed in claim 11, further comprising: and adhesive layer fixing the wire to the antenna glazing.

13. The antenna glazing as claimed in claim 1, further comprising: at least two layers,
wherein the cladding and the coupling electrode are located inside the at least two layers, and at least one of the ends of the coupling electrode or an interface linked to the ends are conducted outside of the two layers.

14. The antenna glazing as claimed in claim 1, wherein the the two layers are two rigid planes bonded together by an adhesive layer that forms said insulation layer.

15. The antenna glazing as claimed in claim 1, wherein the wire has a diameter in a range between 10 µm and 100 µm.

16. A method of using the antenna glazing as claimed in claim 1, comprising the steps of:
first supplying an antenna signal to the coupling electrode;
second supplying electrical power to the coupling electrode superimposed to the antenna signal so as to generate heat with the coupling electrode.

* * * * *